United States Patent [19]

Cartry et al.

[11] Patent Number: 4,819,315
[45] Date of Patent: Apr. 11, 1989

[54] PROCESS FOR ATTACHMENT OF A HOLLOW CYLINDRICAL COMPONENT WITHIN A TUBE AND CYLINDRICAL COMPONENT FOR CARRYING OUT THIS PROCESS

[75] Inventors: Jean P. Cartry; Bruno Fraissenet, both of Lyons, France

[73] Assignee: Framatome, Courbevoie, France

[21] Appl. No.: 57,997

[22] Filed: Jun. 4, 1987

[30] Foreign Application Priority Data

Jun. 4, 1986 [FR] France .................. 86 08065

[51] Int. Cl.$^4$ .................. B23P 15/26; B23P 11/02
[52] U.S. Cl. .................. 29/157.4; 29/432; 29/458; 29/523; 138/89; 165/172; 285/382.4
[58] Field of Search .................. 29/523, 157.4, 157.5, 29/458, 432; 285/382.4, 382.5; 165/172; 138/89, 97

[56] References Cited

U.S. PATENT DOCUMENTS

| | | | |
|---|---|---|---|
| 1,953,665 | 4/1934 | Wallace | 285/382.4 |
| 2,686,353 | 8/1954 | Swarthout | 29/523 U X |
| 3,997,193 | 12/1976 | Tsuda et al. | 29/523 X |

FOREIGN PATENT DOCUMENTS

| | | | |
|---|---|---|---|
| 122610 | 10/1984 | European Pat. Off. | 29/523 |
| 1238027 | 6/1960 | France . | |
| 2572800 | 5/1986 | France . | |
| 518257 | 7/1976 | U.S.S.R. | 29/523 |
| 2079204 | 1/1982 | United Kingdom | 29/523 |

*Primary Examiner*—Charlie T. Moon
*Attorney, Agent, or Firm*—Pollock, Vande Sande & Priddy

[57] ABSTRACT

At least one ring (2) of material having a hardness greater than that of the tube (3) and that of the hollow cylindrical component (1) is arranged around the latter in contact with its outer surface. The cylindrical component is introduced inside the tube (3) and then expanded and crimped at least in its part containing the ring of hard material (2), thereby embedding the ring in the cylindrical component (1) and in the tube (3) at the same time.

9 Claims, 2 Drawing Sheets

PROCESS FOR ATTACHMENT OF A HOLLOW CYLINDRICAL COMPONENT WITHIN A TUBE AND CYLINDRICAL COMPONENT FOR CARRYING OUT THIS PROCESS

FIELD OF THE INVENTION

The invention relates to a process for strong and tight attachment of a hollow cylindrical component within a tube, and to a hollow cylindrical component which enables this process to be implemented. The invention applies especially, but not exclusively, to the lining and to the plugging of the tubes of a steam generator.

BACKGROUND OF THE INVENTION

The steam generators of pressurized water nuclear reactors comprise a bundle consisting of a very large number of tubes the ends of which are crimped into a very thick tube plate.

During long-term use of such a steam generator, cracks causing a leak may appear on the sides of some tubes in the bundle. As the walls of the tubes from the separation between the primary fluid of the reactor and the water supplied to the steam generator, these leaks must be detected and repaired by servicing of the steam generator during a stoppage of the nuclear reactor.

Such repairs are well known and involve either plugging of the end of the tubes which leak, or lining of the cracked part of these tubes.

In the case of plugging, a hollow cylindrical component closed at one of its ends, the outer diameter of which is slightly less than the inner diameter of the tube in its crimped part, is introduced into the end of the tube crimped into the tube plate. Diametrical expansion of this cylindrical component is then carried out in a joining region close to the entry side of the tube plate, until the outer surface of the cylindrical component is in perfect contact with the inner surface of the tube. Attachment of the cylindrical component which forms the plug is completed by a crimping of its part which has undergone diametrical expansion within the tube and, if required, by welding its end, ensuring perfectly tight sealing of the tube.

In the case of lining, a cylindrical component or sleeve, of an outer diameter less than the inner diameter of the tube and open at its two ends, is introduced into the tube to be lined through the entry side of the tube plate. The length of the sleeve is generally greater than the thickness of the tube plate, and the sleeve is introduced into the tube plate until its end is flush with the end of the tube. The other end of the sleeve then projects from the outlet side of the tube plate. In the case of a lining process which was recently developed and which can preferably be applied to the peripheral tubes of the steam generator, a sleeve of a length substantially less than the thickness of the tube plate is employed. The sleeve is introduced into the tube so that it projects on one side from the outlet side of the tube plate. The other end of the sleeve is then situated within the part of the tube which is crimped into the tube plate and in a region substantially away from the entry side.

In both cases, the fastening of the sleeve in the tube is carried out by diametrical expansion followed by crimping of the sleeve in two regions near its ends. One of these regions is within the tube plate and the other region, beyond the outlet side of this plate, in an uncrimped part of the tube.

The crimping in this region situated outside to the tube plate is carried out so that the sleeve undergoes a plastic deformation and the tube an elastic deformation only. Therefore, the crimping is ensured by the radial stresses of elastic origin which operate in the tube.

Both in the case of plugging the tubes and in the case of lining, it is essential to carry out a thorough cleaning of the inner surface of the tube and the outer surface of the cylindrical component in the joining regions, in order to obtain a perfect tightness of these joints. The cleaning of the inner surface of the tube is an operation which is delicate and difficult to perform, especially in the case of a steam generator of a nuclear reactor, the tubes of which have a certain radioactivity and are accessible only with difficulty.

Moreover, despite thorough cleaning of this inner surface, the joint finally obtained is not always perfectly tight, and it is often necessary to complete the repairs with a welding of the end of the plug or of the sleeve on the tube.

Such a welding operation may lead to undesirable structural modifications or deformations of the tube.

Plugs or sleeves containing channels or grooves on their outer surface have also been proposed. However, such machinings have only a very limited effect on the tightness of the joint obtained by the crimping of the plug or of the sleeve, in the tube, the projecting parts of the sleeve the hardness of which is close to that of the tube, being crushed against the inner surface of the tube during the crimping.

It has also been proposed, for connecting tubes with a sieve surrounding the connection end parts of the tubes, to place a sealing material containing hard particles between the sleeve and the tubes, then to press the sleeve against the tube, so that the hard particles are embedded both in the sleeve and the tube. Such a process cannot be applied in the case of the lining or plugging of a steam generator tube, as it requires use of a sealing material like rubber or plastic in which the particles are embedded.

Finally, it has also been proposed to carry out the lining by welding or brazing the sleeve within the tube. Such an operation is extremely complex and prolongs significantly the servicing time of the steam generator.

SUMMARY OF THE INVENTION

The object of the invention is therefore to propose a process for the strong and tight attachment of a hollow cylindrical component within a tube, by the diametrical expansion and crimping of the cylindrical component within the tube, and embedding in the tube and the cylindrical component at the level of their connection zone of at least one element of a hard material disposed between the tube and the cylindrical component, by simple and rapid operations which do not involve the welding of the cylindrical element on the tube.

For this purpose, at least one ring of a material having a hardness greater than that of the tube and of the cylindrical component is arranged on the outer surface of the cylindrical component, the initial outer diameter of which is less than the inner diameter of the tube, and in contact with the outer surface of the component, the thickness of the ring being less than the difference between the inner radius of the tube and the initial outer radius of the cylindrical component.

The cylindrical component on which the ring has been arranged is introduced into the tube so that the ring is located in a part of the tube in which the attachment of the cylindrical component to take place, and expansion followed by crimping of the cylindrical component is carried out, at least in its part comprising the ring, so as to embed the same in the cylindrical component and the tube at the same time.

The invention also relates to a hollow cylindrical component comprising around and in contact with its outer surface at least one ring of a material of greater hardness than the material of the hollow cylindrical component.

BRIEF DESCRIPTION OF THE DRAWINGS

In order that the invention may be more clearly understood, several embodiments of the process according to the invention, in the case of lining and in the case of plugging of a tube of a steam generator, will now be described by way of example.

DESCRIPTION OF PREFERRED EMBODIMENTS

Figure 1:
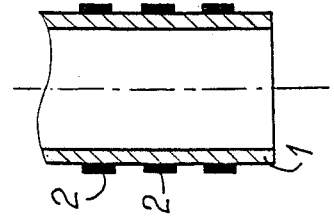
FIG. 1 is a cut-away view of the end of the cylindrical component containing a coating of hard material in several annular regions.

FIG. 1 shows the end of a sleeve 1 permitting the lining of a steam generator tube. This sleeve 1 has an outer diameter slightly less than the inner diameter of the tube to be lined. For a generator tube of a pressurized water nuclear reactor, the inner diameter of which is slightly less than 20 mm, a sleeve 1 having radial play in the tube of the order of 0.2 mm is used.

Prior to the introduction of the sleeve 1 into the tube to be lined, a chromium layer 2 of a thickness between 0.10 and 0.15 mm is deposited on the outer surface of the tube 1, in three successive annular regions near the end of the sleeve. Thus, the chromium depositions 2 form three rings surrounding the sleeve 1 adjacent its end. The chromium rings 2 have a width of the order of 4 mm and are spaced apart from one another by a distance of the same order.

The deposition may be carried out by an electrolytic or chemical process which is well known for obtaining coats of hard chromium.

The rings 2 have hardness greater than the hardness of the sleeve 1, which is made of a nickel alloy of the same grade as that of the tube to be repaired.

Three chromium rings analogous to the rings 2 are also deposited adjacent the other end of the sleeve 1 (which cannot be seen on FIG. 1).

Figure 2:
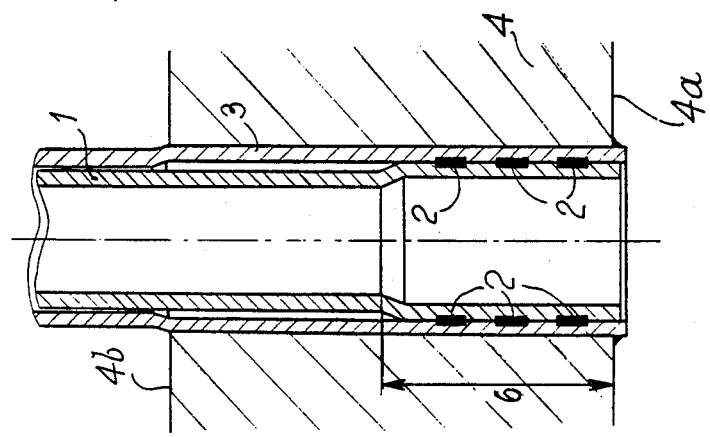
FIG. 2 is a cut-away view of the end of a steam generator tube in which the lower end of a lining sleeve has been fastened by the process according to the invention.

FIG. 2 shows the lower end of a steam generator tube 3 crimped along the entire length of a hole passing through the tube plate 4 of the generator, through its entire thickness. The tube 3 containing a crack on its side has been lined by a sleeve 1 such as the sleeve shown on FIG. 1. This sleeve 1 contains three chromium rings 2 in its lower part 6 corresponding to the part of the sleeve shown in FIG. 1 and by means of which attachment of sleeve 1 to tube 3 is achieved.

This lower part 6, which is slightly pre-expanded compared with the running part of the sleeve 1, is introduced into the tube 3 through the entry side 4a of the tube plate. This introduction remains possible in spite of the presence of the chromium rings, because the thickness of these rings is slightly less than the radial play which exists between the sleeve 1 and the tube 3 at the time the sleeve is introduced. The pre-expansion of the lower end of the sleeve makes it possible to compensate only for the decrease in thickness of the tube 3 due to its crimping into the tubular plate 4.

After introducing the sleeve 1 into the tube 3, in its position shown in FIG. 2, diametrical expansion of the sleeve 1 is carried out in its lower part 6, until the chromium rings 2 engage with the inner surface of the tube 3.

Figure 3:
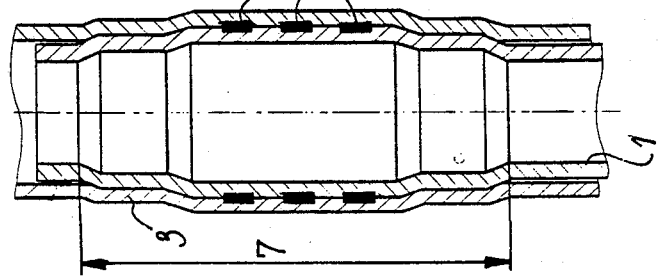
FIG. 3 is a cut-away view of a part of a steam generator tube, external to the tubular plate, in which the upper end of a sleeve has been fastened by the process according to the invention.

FIG. 3 shows a part of the tube 3 situated above the outlet side 4b of the tubular plate 4, that is, external to this tubular plate. The upper part of the sleeve 1 which is located in this part of the tube, external to the tubular plate, contains three chromium rings 2' identical to the rings 2 of the lower part of the sleeve.

The upper region 7 of the sleeve 1 undergoes a diametrical expansion within the tube until the chromium rings 2' engage with the inner surface of the tube 3.

The sleeve 1 is then retained within the tube 3 by both its lower part 6 and its upper part 7, the diametrical expansion of which has been carried out within the tube.

In order to ensure the complete attachment of the sleeve 1 within the tube 3, crimping of the sleeve 1 within the tube 3 is then carried out in zones 6 and 7, shown in FIGS. 2 and 3, respectively. For this purpose, a tube expander comprising rollers driven by a conical shaft is introduced into the sleeve, successively at the level of regions 6 and 7.

As can be seen on FIGS. 2 and 3, during the crimping operation, the rings 2 and 2' become embedded simultaneously in the side of the sleeve 1 and the side of the tube 3, which are made of a nickel alloy the hardness of which is less than the hardness of the chromium of the rings 2 and 2'.

In the case of the lining of a steam generator tube, the chromium rings of the lining sleeve penetrate into the tube 3 by a depth equal to one quarter of their thickness and into the sleeve 1 by a depth equal to three quarters of their thickness.

The crimping of the lower part 6 of the sleeve 1 is carried out by rolling the side of the sleeve against the tube 3 within the tube plate, only the sleeve 1 undergoing a plastic deformation.

In contrast, the crimping of the sleeve 1 in its upper region 7 is carried out by a diametrical expansion of the sleeve 1 and of the tube 3, the deformation of the tube 3 nevertheless remaining in the elastic region whereas the sleeve 1 undergoes a significant plastic deformation.

Figure 4:
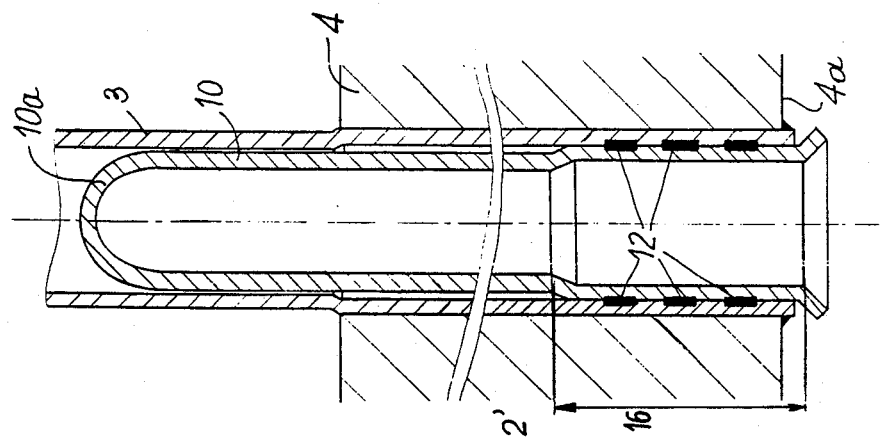
FIG. 4 is a cut-away view of the lower end of a steam generator tube in which a plug has been fastened by the process according to the invention.

FIG. 4 shows the lower end of a steam generator tube 3 crimped in a hole passing through the tube plate 4 of the stream generator. A plug 10 has been fastened to the end of the tube, within the tube plate 4, by the process according to the invention.

For this end, the plug 10, consisting of a hollow cylindrical component the upper end 10a of which is closed, is introduced into the tube 3 through the entry side 4a of the tubular plate, after three chromium rings 12 have been deposited on its slightly pre-expanded lower part 16. As before, the chromium rings 12 have a thickness of between 0.10 and 0.15 mm, slightly less than the radial play between the pre-expanded part 16 of the plug and the inner surface of the tube 3 crimped within the tube plate 4. Each of the chromium rings has a width of the order of 4 mm, and the rings are separated by a distance of approximately 4 mm.

The diametrical expansion of the part 16 of the plug 10 is then carried out until the rings 12 engage with the inner surface of the tube 3.

The fastening of the plugs within the tube 3 is completed by carrying out a roller expansion in the region 16 within the tube 3 and the plate 4. During the roller expansion operation, the chromium rings 12 penetrate simultaneously into the tube 3 and into the sleeve 10, thereby assuring extremely strong attachment of the plug in the tube 3.

Both in the case of the sleeve shown in FIGS. 2 and 3 and in the case of the plug shown in FIG. 4, the regions of joining with the tube ensure tightness sufficient to obviate additional welding for tightness at the end of the sleeve or at the end of the plug.

This tightness results from the embedding of the rings 2, 2' and 12 in the sides the joining of which is to be ensured, and which with contact with each other at the end of the roller expansion, the rings embedded in the metal resulting in a baffle effect for fluids located on either side of the joining region.

Moreover, the bond between the tube and the sleeve or the plug is extremely strong because of the anchoring effect of the rings.

Thus, the lining sleeves fixed within the steam generator tubes by the process according to the invention were found to withstand a load of 3,500 kg in a tensile test without being torn off.

Figures 5, 6:
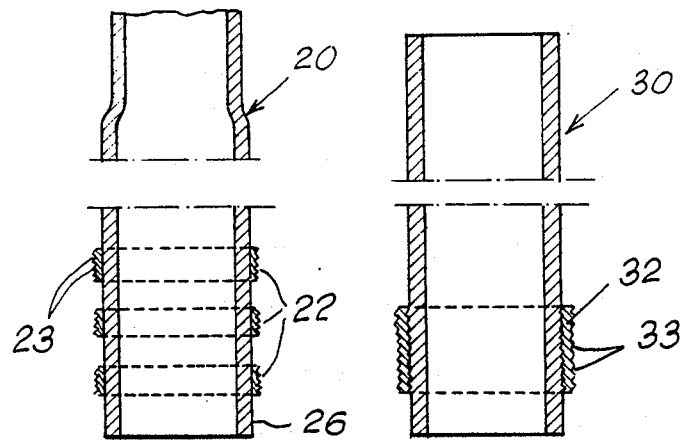
FIG. 5 is a cut-away view of the end of a cylindrical component according to a second embodiment comprising three rings of hard material engaged on its outer surface.
FIG. 6 is a cut-away view of the end of a cylindrical component according to a third embodiment comprising one ring of hard material engaged on its outer surface.

FIG. 5 shows a cylindrical component 20 according to a second embodiment. The component 20 is, for example, a sleeve or a plug intended to be fastened in a tube of a steam generator as previously described. The component 20 comprises a pre-expanded end part 26 intended to be placed in the part of the steam generator tube which is crimped in the tubular plate. Three rings 22 of a nickel alloy having a hardness greater than the hardness ot the alloy of the tube and that of the component are arranged around the pre-expanded part 26.

The rings 22 comprise peripheral grooves 23 on their external cylindrical surface and have a smooth internal cylindrical surface. The internal diameter of the rings 22 is such that the rings are in contact with the external surface of the part 26 of the component 20 and forcedly engaged on the component. Their thickness is such that the component 20 with the rings arranged thereon can be introduced into the tube to be repaired.

For repairing a steam generator tube having an internal diameter a little smaller than 20 mm, a sleeve having, in its pre-expanded part 26, three rings like the rings 22 has been used. The rings have a length of 5 mm, a thickness of 0.25 mm, and are spaced from each other by a distance of 5 mm in the axial direction. The grooves 23 have a depth in the radial direction of about half the thickness of the rings, i.e., about 0.10 to 0.12 mm. During the crimping of the sleeve in the tube, the radially projecting parts of the rings between the grooves 23 are embedded in the internal surface of the tube, thus ensuring a strong connection between the sleeve and the tube.

The fluid tightness of the connection is ensured by a baffle effect of the parts of the ring embedded in the tube. The internal smooth part of the rings is crimped and slightly embedded in the sleeve.

This embodiment has the advantage, when compared to chromium rings deposited on the outer surface of the sleeve, that the rings of nickel alloy are less subjected to cracking during the crimping of the sleeve.

The resulting tightness is thus better.

FIG. 6 shows a hollow cylindrical component 30 according to a third embodiment. The component 30 is, for example, a sleeve or a plug for repairing or plugging a steam generator tube.

The hollow cylindrical component 30 has not been pre-expanded and its outer diameter is significantly smaller than the internal diameter of the tube.

A ring 32 is disposed around the cylindrical component 30 in the zone of the component intended to be expanded and crimped in the tube to be plugged or repaired.

The ring 32 comprises radially projecting parts defined by peripheral grooves 33 on both its outer surface and its inner surface. The ring 32 is forcedly engaged on the external surface of the component 30.

After the component 30 has been introduced into the tube, it is directly crimped without any prior hydraulic expansion. The crimping results in embedding the projecting parts between the grooves 33, in the steam generator tube and in the computer 30 as well.

In the case of a steam generator tube the internal diameter of which is a little less than 20 mm, a ring 30 having a length of 15 mm and a thickness of 0.8 mm is used, the play between the tube and the component being larger than in the preceding example. The depth of the grooves is between 0.10 and 0.12 mm.

The embedding of the projecting parts between the grooves 33 simultaneously ensures the anchoring and the tightness of the component 30 in the tube.

Figure 7:
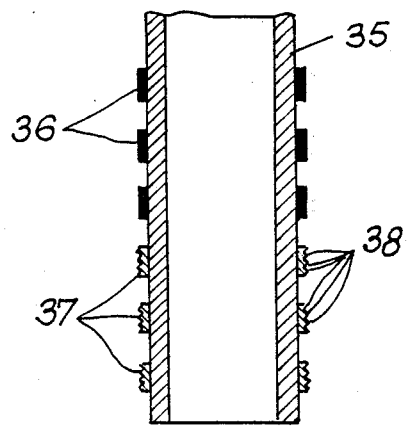
FIG. 7 is a cut-away view of the end of a cylindrical component according to a fourth embodiment.

FIG. 7 shows a fourth embodiment of a tubular component 35 is seen. The initial external diameter of the component is smaller than the internal diameter of a steam generator tube in which the component 35 is intended to be fastened.

On a part of the external surface of the component 35, three chromium rings 36 have been deposited as described with reference to FIG. 1. On another part of the component 35, three successive rings 37 of nickel alloy have been arranged as described with reference to FIG. 5. The rings 37 have radially projecting parts defined by grooves 38 machined on their outer surface.

The rings 36 and 37 are in a pre-expanded zone of the component 35.

After introducing the tubular component in the tube to be plugged or repaired, the component 35 is crimped in two passes. A crimping pass is effected in the zone where the rings 36 are disposed and another pass in the zone where the rings 37 are disposed. The length of each crimping pass is about 40 mm.

This embodiment ensures at the same time a very good anchoring of the component 35 in the tube and a very good tightness.

The process according to the invention is extremely effective and easy to carry out and provides very good tightness without the need to carry out a welding of the cylindrical component attached to the tube.

Rings of any appropriate material may be deposited or arranged around the tubular component to be fastened into the tube. The rings may have projecting parts of any shape to facilitate embedding into the metal of the tube and of the tubular component.

Various process can be employed for carrying out the deposition of the hard material on the cylindrical component. However, continuous deposition of chromium is preferably carried out by the electrolytic method on the end of the cylindrical component, and then, when the thickness of this deposit corresponds to the thickness desired for the rings, the electrolysis is stopped and the successive rings are machined by grinding the chromium layer in the annular regions of separation between the rings.

The deposition of chromium in the successive discontinuous regions could also be carried out, for example, by covering the intermediate part of separation between the annular regions to be coated.

The deposition of chromium may be carried out in ways other than by electrolysis, for example by chemical deposition.

Instead of chromium, another hard metal such as tungsten may be deposited on the cylindrical component.

Hard alloys such as those sold under the name of Stellite could also be deposited. However, these alloys must be deposited with the use of heat, for example with a blow torch, and thid technique has disadvantages compared with a cold deposition, such as by electrolysis.

A hard material such as tungsten carbide in a cobalt matrix could also be used. Although the use of three successive rings, as in the embodiments described, is particularly satisfactory, a greater or smaller number of rings of the hard maerial in each of the joining regions may be used, depending on the degree of tightness and strength required for the joint.

The thickness of the rings is generally determined by the initial play between the tube and the cylindrical component which is fastened in this tube, this thickness being such that it allows introduction and positioning of the cylindrical component in the tube without difficulty.

The width of the rings is determined, as a function of the number of rings, by the strength and the tightness sought.

The fastening process is used both the lining of steam generator tubes with a sleeve of a length greater than the thickness of the tube plate, and for lining with a short sleeve which can preferably be applied to peripheral tubes; in the case of short sleeving, the crimping of the lower region of the sleeve with embedding of the rings of the hard material is carried out in a region located within the tube plate and away from the entry side of this plate in the case of short sleeving.

Finally, the attachment process according to the invention is applied not only to the plugging and the lining of steam generator tubes, but also to the attachment of any hollow cylindrical parts within a tube, when very great strength and tightness of the joining region is sought.

We claim:

1. Process for strong and tight fastening of a hollow cylindrical component within a tube by diametrical expansion and crimping of the cylindrical component within the tube, and embedding in the tube and the cylindrical component, at the level of their connection zone, of at least one element of a hard material disposed between the tube and the cylindrical component, said process comprising the steps of
   (a) depositing a hard coating material around the cylindrical component the initial outer diameter of which is less than the inner diameter of the tube, on the outer surface of the component, in at least two zones of annular shape, the hardness of rings obtained by deposition being greater than the hardness of the tube and greater than that of the cylindrical component, and the thickness of the rings being less than the difference between an inner radius of the tube and an initial outer radius of the cylindrical component;
   (b) introducing the cylindrical component on which the rings has been deposited into the tube so that the rings are located in a part of the tube in which the fastening of the cylindrical component is to be carried out; and
   (c) carrying out expansion followed by crimping of the cylindrical component, at least in its part comprising the rings of hard coating material, so as to embed both rings in the cylindrical component and the tube at the same time.

2. Fastening process according to claim 1, wherein the coating material of the annular regions consists of chromium.

3. Fastening process according to claim 1, wherein the coating material is deposited in a continuous region of the outer surface of the cylindrical component, and wherein the continuous layer of coating material is then machined along several annular regions of separation, in order to form successive rings of the coating material on the outer surface of the cylindrical component.

4. Fastening process according to claim 1, wherein the deposition of the coating material is carried out by electrolysis.

5. Fastening process according to claim 1, wherein the coating material is deposited in three successive annular regions, in order to form three rings, in each of the joining regions between the cylindrical component and the tube.

6. Fastening process according to claim 1, wherein the rings of the coating material have a thickness of between 0.10 and 0.15 mm.

7. Fastening process according to claim 1, wherein at least one further ring is engaged on the outer surface of the cylindrical component before it is introduced into the tube.

8. Fastening process according to claim 1, in the case where the tube is a steam generator tube and the cylindrical component is a sleeve for lining this tube, said sleeve having two ends, wherein at least two successive rings are arranged around each of the ends of the sleeve before it is introduced into the tube of the steam generator, so that one of the end parts of the sleeve is within the tube in its part crimped into a tubular plate and the other end part of the sleeve within the tube in its part external to the tubular plate.

9. Fastening process according to claim 1, in the case where the tube is a steam generator tube and the cylindrical component a plug for the tight sealing of this tube, wherein at least two successive rings are arranged on one end part of the plug, this part of the plug being introduced into the part of the tube crimped within a tubular plate of the steam generator.

* * * * *